Figure 1:
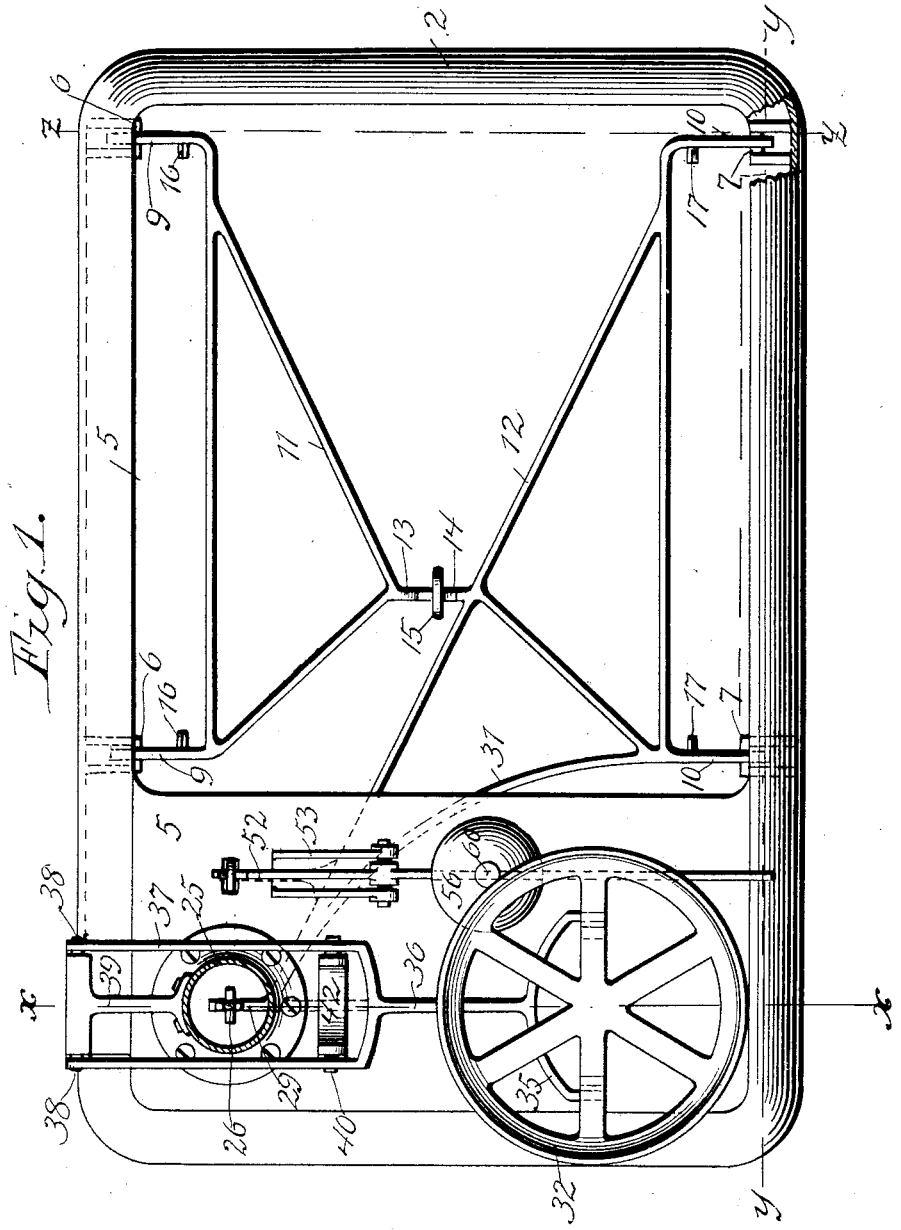

(No Model.) 4 Sheets—Sheet 1.

L. WOMMER, Dec'd.
A. L. E. WOMMER, Administratrix.
PLATFORM SCALE.

No. 512,081. Patented Jan. 2, 1894.

Witnesses.
J. Jensen
O. G. Hawley

Inventor
Louis Wommer.
By Paul & Mewin Atty's

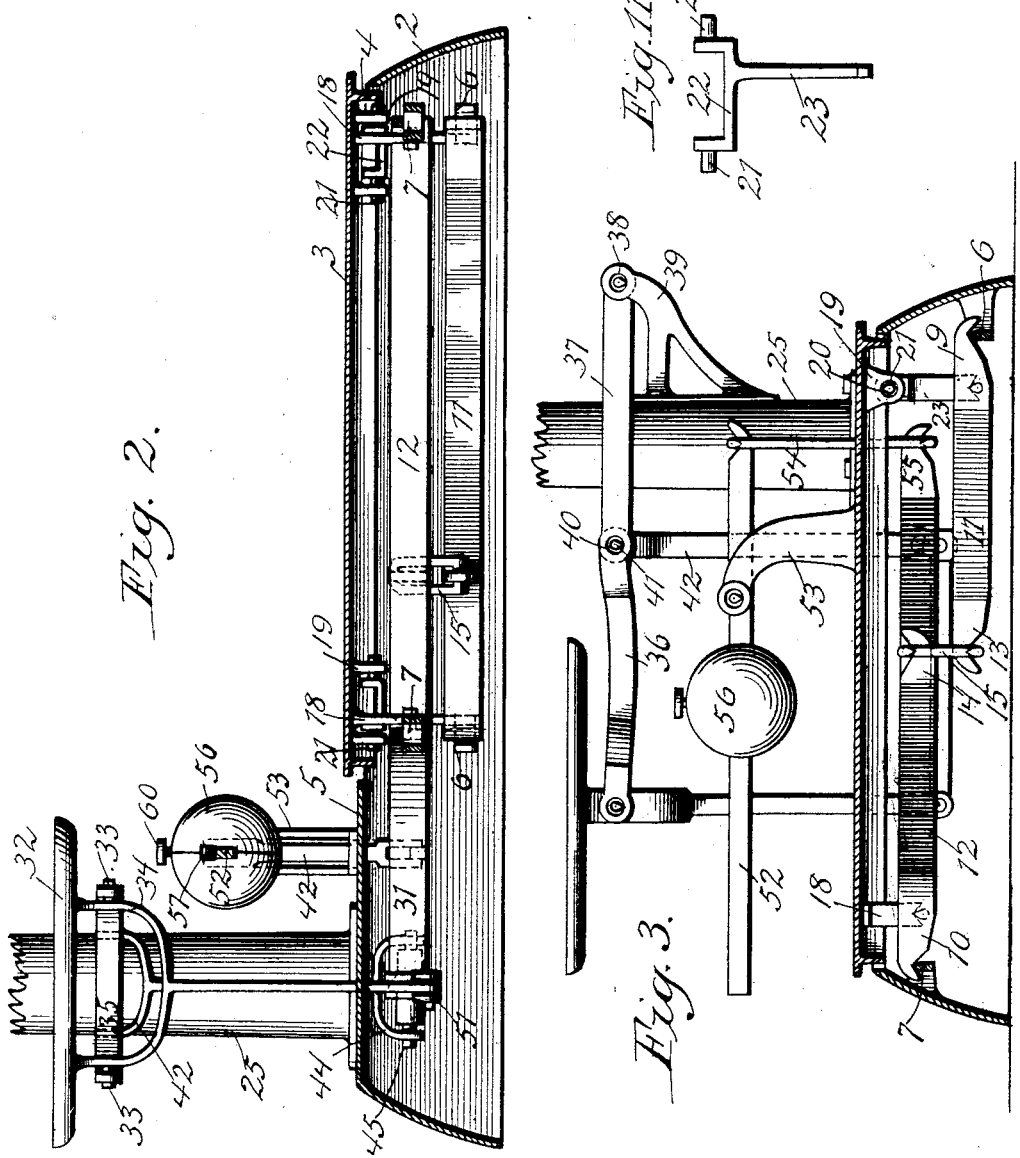

(No Model.) 4 Sheets—Sheet 3.
L. WOMMER, Dec'd.
A. L. E. WOMMER, Administratrix.
PLATFORM SCALE.
No. 512,081. Patented Jan. 2, 1894.
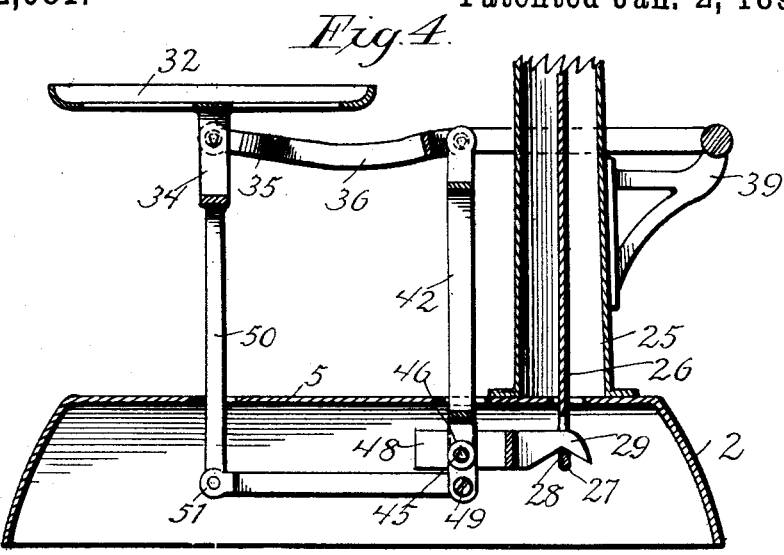
Fig. 4.
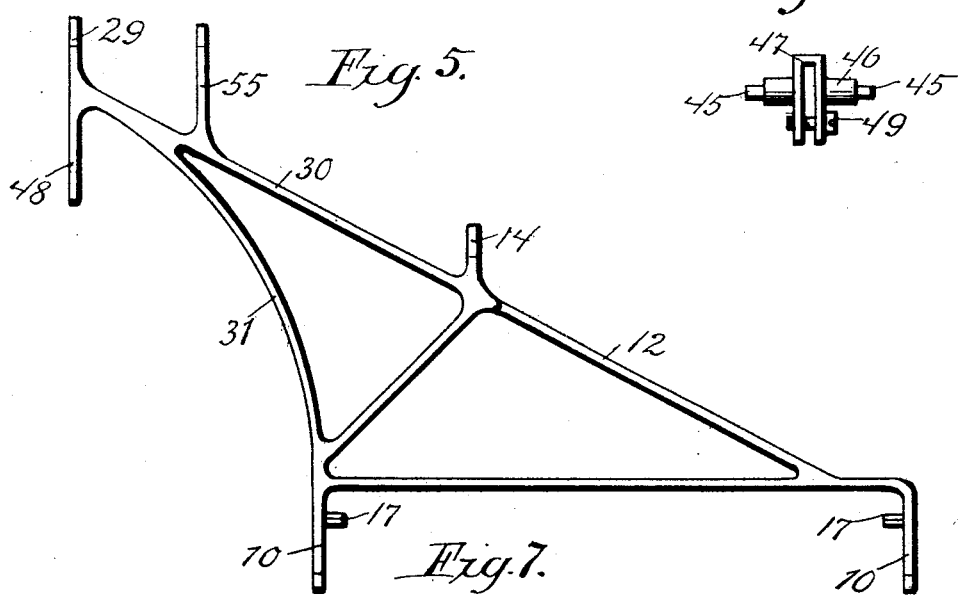
Fig. 5.
Fig. 6.
Fig. 7.
Witnesses.
J Jensen.
O. G. Hawley.
Inventor:
Louis Wommer
By Paul & Mermin Atty's

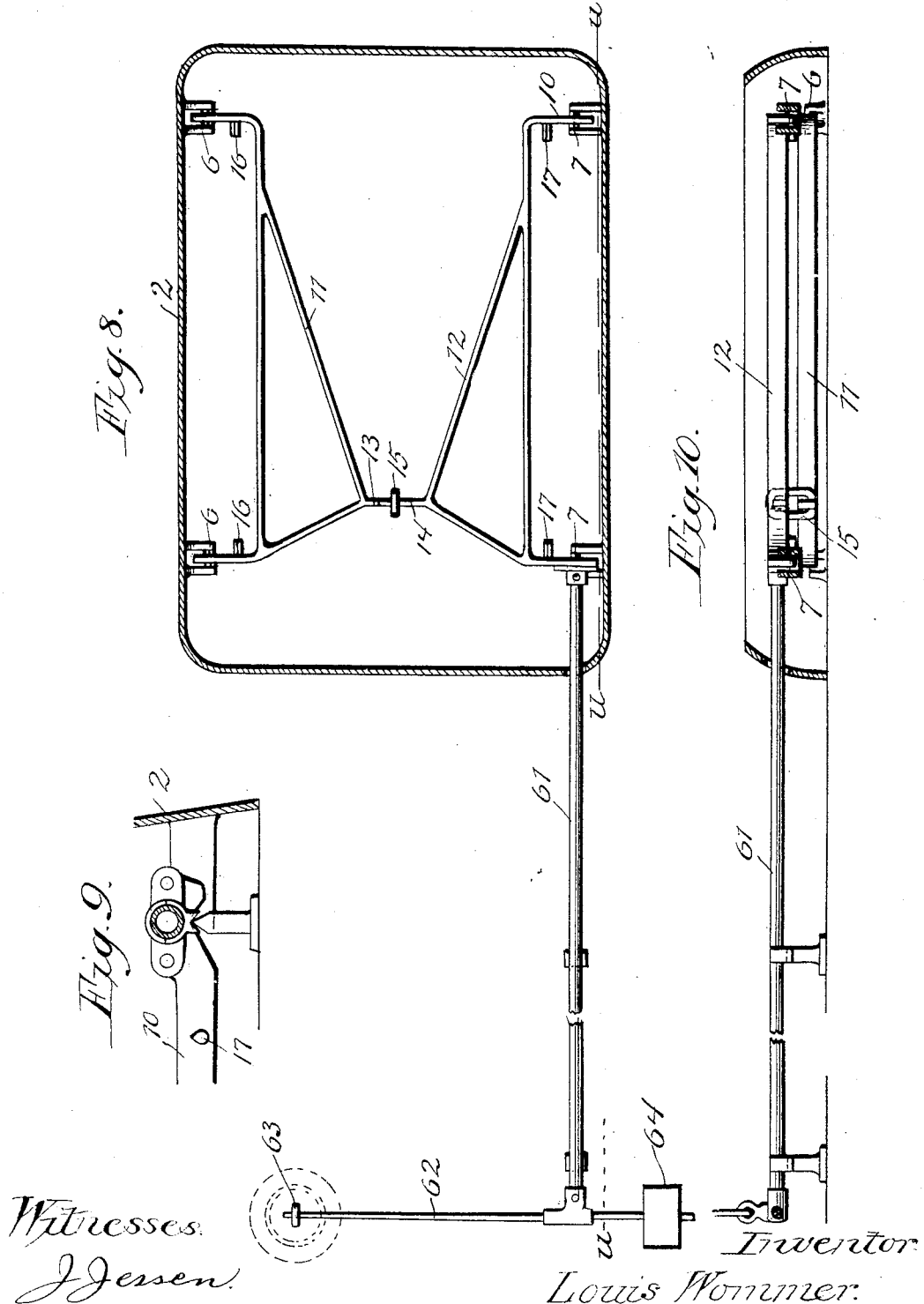

UNITED STATES PATENT OFFICE.

LOUIS WOMMER, OF MINNEAPOLIS, MINNESOTA; ANNA L. E. WOMMER ADMINISTRATRIX OF SAID LOUIS WOMMER, DECEASED.

PLATFORM-SCALE.

SPECIFICATION forming part of Letters Patent No. 512,081, dated January 2, 1894.

Application filed May 20, 1892. Serial No. 433,763. (No model.)

*To all whom it may concern:*

Be it known that I, LOUIS WOMMER, of Minneapolis, Hennepin county, Minnesota, have invented certain new and useful Improvements in Scale-Platforms, of which the following is a specification.

My invention relates to a newly invented platform of a construction which renders it peculiarly applicable for use in connection with automatic weighing scales and the object of the invention is to provide a scale platform in which the depression and fall of the platform or table proper will be in direct proportion to the comparative weight of the article or articles placed thereon, and further, to provide means by which the platform may be connected with a scale indicator situated at some distance therefrom. These objects I attain in the mechanism hereinafter described and particularly pointed out in the claims.

The invention will be more readily understood by reference to the accompanying drawings, in which—

Figure 1 is a plan view of a scale platform embodying my invention, the platform proper being removed to clearly show the reduction levers. Fig. 2 is a side view of the same as seen on the line $y-y$ of Fig. 1. Fig. 3 is a transverse view on the line $z-z$ of Fig. 1. Fig. 4 is a vertical section on the line $x-x$ of Fig. 1. Fig. 5 illustrates the principal lever removed. Fig. 6 is a detail view of the knife edges and the clamps for securing the same upon one of the levers. Fig. 7 is a sectional view showing in detail the construction of the counterpoise. Fig. 8 is a plan view of the platform showing its levers and manner of connecting same with a remote weight indicating device. Fig. 9 is an enlarged detail taken from Fig. 8. Fig. 10 is a vertical section on the line $u-u$ of Fig. 8. Fig. 11 is a detail view of one of the platform supporting links.

As shown in the drawings, 2 represents the oblong platform base and 3 the vertically movable platform or table proper, having the depending flange 4 operating through the large square opening 5 of the base 2. Beneath the overhanging side walls of the base are the four knife edge bearings 6, 6 and 7, 7, upon which rest the outer ends 9 and 10 respectively of the reduction levers 11 and 12, said ends being notched on the lower edges as shown. The reduction levers have substantially the same form being of the triangular shape shown and each having a projecting end 13, 14 respectively, notched on opposite edges and adapted to engage with the knife edge connecting link 15 as shown plainly in Figs. 1 and 3. The levers are of necessity arranged one above the other and the platform is supported on the same on the knife edges 16, 16 and 17, 17. From the lower side of the platform the lugs 18 notched at their lower ends project down to engage the knife edges 17 while on the other side of the platform are the pairs of lugs 19 provided with the holes 20 adapted to receive the knife edged lugs 21 provided on the yokes 22 of the two depending links 23 notched at their lower ends to rest upon the knife edged bearings 16 of the lower reduction lever. This link connection between the platform and the levers permits the bearings therefor to operate smoothly without friction as all lateral play between the knife edges and the bearings of the platform is avoided. Owing to this link connection with one side of the platform, the same is adapted to a much greater throw than any of the platforms heretofore devised, thereby rendering my platform particularly applicable to use with automatic weighing scales, where the fall or depression of the platform is always in direct proportion to the weight of the body placed thereon.

At one corner of the platform is the vertical post or standard 25 upon the upper end of which is usually arranged the automatic indicator. The draw rod 26 extends down through this post and through the top of the platform being provided at its lower end with the hook or eye 27 having a knife edge 28 to be engaged by the arm 29 projecting transversely from the long diagonal extension or arm 30 of the reduction lever 12. This diagonal arrangement of the arm renders it possible to secure the proper length of the main reduction lever within the smallest possible space. An integral brace 31 extending between the outer ends of the extension 30 and the forward part of the reduction lever acts to stiffen the whole device.

For weighing small bodies I provide the scoop rest or rack 32 which is supported upon the knife edges 33 engaging its yoke 34. The knife edges are secured in the large yoke 35 provided upon the lever 36, the rear end of which is made up of the longer and narrower yoke 37 having its rear end pivoted on the knife edge bearings 38 arranged on the brackets 39 secured to the outside of the post 25, as shown in Fig. 3. At an intermediate point on the lever I provide the holes or bearings 40 to receive the knife edges 41 provided on the upper end of the vertical rod 42. This rod has on its lower end a yoke 44 provided with openings to receive the knife edge studs 45 arranged on the short shaft 46 having the intermediate clamp 47 by means of which the bearings are adjustably secured upon the rectangular projection 48 of the main reduction lever. After adjustment the clamp is secured by tightening the screw 49. For holding the scoop rack level I provide the depending rod or stem 50 projecting through the top 5 and having its lower end held in the proper position by the pivotal link 51 connecting the same with the clamp, being held therein by the screw 49. In this manner a greater purchase on the reduction levers is secured through the depressing rod 42 than from the platform 3. The action upon the indicating device through the long arm 36 is obviously the same in either case, differing only in degree.

For temporarily balancing the scale when a basket, barrel or wagon is placed upon the platform or a smaller receptacle placed upon the scoop rack or rest in order that the true weight of the material therein may be ascertained I provide a weighted lever 52 pivoted on the vertical bracket 53 and having its short arm connected with the main reduction lever by the link 54 extending down to engage the arm 55 on the part 30 of said lever, as shown in Figs. 3 and 5. The weight 56 has a large slot 57 to admit the lever 52 and is secured on the lever by the bow spring 58. Two pins 59 are arranged within the slot and beneath the spring so that by pushing down on the button 60 the end of the spring may be lifted from engagement with the top of the lever to permit adjustment of the weight thereon.

It is often desirable to locate the indicating mechanism at a point some distance from the platform, as for instance in a large wagon or grain scale. Such an arrangement I have shown in Figs. 8, 9 and 10. A rocking shaft 61 is secured upon the inner end of one of the reduction levers at a point just over the knife edge thereof. This rod extends outward to a position in line with the indicator and upon its end I secure the lateral arm 62 of the proper length to give the necessary reduction and connected at its outer ends with the draw bar 63 of the indicating device. The arm is preferably balanced by a weight 64. The rocking shaft 61 is supported at convenient points by knife edge bearings, as shown most plainly in Fig. 9.

Having thus described my invention, I claim as new and desire to secure by Letters Patent—

1. The combination with the platform base, of the reduction levers pivotally supported thereon, the pivotal connection between the free ends of said levers, the platform, the fixed bearings thereon to engage one of said levers and the pivotal bearings at the opposite side or edge of the platform to engage the other lever, substantially as described.

2. The combination with the platform base, of the vertically movable platform, the reduction levers, knife edge bearings therefor on said base, the pivotal knife edged link connecting the free end of the said lever, the fixed bearing lugs 18 of the platform, the lugs 20 thereon and the links 23 having bearings therein and on the reduction lever, substantially as described.

3. The combination with the vertically movable platform, of the reduction levers pivotally supported beneath the same and whereon said platform is supported, a diagonal extension on one of said levers, said extension provided with the transverse projections 29 and 48, the draw rod pivotally connected with the former, the depressing rod pivotally secured upon the latter and the scoop frame or rest arranged in connection with said depressing rod substantially as described.

4. The combination with the platform base, of the platform, the reduction levers pivotally supported on said base and whereon said platform is pivotally supported, said levers having their free ends connected, the standard arranged on said platform base, the draw rod therein, the extension of one of said reduction levers connected with said draw rod the pivoted lever 36, the scoop rest or frame arranged on the outer end thereof, the intermediate depressing rod, the lateral projection 48 on the extension of the reduction lever, and the adjustable clamp to be secured on said projection and provided with bearings for the lower end of said depressing rod, substantially as described.

5. The combination with the platform, of the reduction levers, the extension 30 upon one of said reduction levers, the lateral projections 29, and 48 thereon, the draw rod connected with the former, the depressing rod adjustably connected with the latter, the pivoted scoop rack lever, the depending rod 50 of said rack and the link 51, all as and for the purpose specified.

6. The combination with the platform base, of the vertically movable platform, the reduction levers pivoted on said base and whereon said platform is adapted to rest the diagonal extension 30 of one of said levers, the lateral projection 55 thereon, the pivoted counterbalance and tare weight lever the link 54 extending between the same and the projection 55, and the weight 56 arranged on said lever and adjustable thereon, substantially as described.

7. The combination with the lever 52 of the weight 56, the bow spring 58 arranged within the same and adapted to engage the lever 52 the stop pins 59 and the push button 60 substantially as described.

8. The combination with the reduction levers having their free ends pivotally connected and the platform supported on said levers, the extension 30 and the brace therefor, the transverse projection 29 connected with the draw rod of the scale, the transverse projection 48, the clamp 47 arranged on said projection, the clamping screw thereof, the laterally projecting bearings provided on said clamp the depression rod pivoted thereon and the scoop rack connected therewith, substantially as described.

9. The combination with the vertically movable platform, of the platform base, with the reduction levers pivoted on said base and pivotally connected, the fixed lugs 18 on the platform to engage bearings on one of said levers, the lugs 20 on the other side of the platform, knife edge bearings upon the lever beneath the same and the links 23 having the yokes 22 provided with bearing studs to engage the lugs 20 substantially as and for the purpose specified.

10. The combination with the reduction lever having the diagonal extension, of the draw rod connected with the same, the transverse projection on said lever, the clamp adjustably secured thereon and having the knife edges, the scoop rest or frame, the lever 36 thereon and the depressing rod whereon the same is pivoted and having its lower end engaging said knife edges, substantially as described.

In testimony whereof I have hereunto set my hand this 20th day of April, 1892.

LOUIS WOMMER.

In presence of—
A. C. PAUL,
F. S. LYON.